3,598,885
PROCESS FOR PREPARATION OF LOW
MOLECULAR WEIGHT POLYMERS
Edwin F. Peters, Lansing, Ill., assignor to Standard Oil
Company, Chicago, Ill.
No Drawing. Filed July 11, 1968, Ser. No. 743,919
Int. Cl. C08f 1/88, 15/00
U.S. Cl. 260—878                                3 Claims

ABSTRACT OF THE DISCLOSURE

Low molecular weight polymers are prepared by polymerization of 1-olefins through methods which lead to relatively thermally stable polymers of high molecular weight which are intimately mixed with relatively thermally unstable polymers to produce an admixture of the two polymers which is then subjected to thermal cracking, following which a lower molecular weight polymer cracked from the relatively stable high molecular weight polymer can be recovered. A desirable method for obtaining the intimate admixture is preparation of the high molecular weight polymer in a reaction system containing the relatively thermally unstable polymer.

---

My invention is a process for the preparation of low molecular weight polymers. These are prepared by way of high molecular weight polymers obtained from any of a number of polymerization processes known to the polymerization art. High molecular weight polymers often possess such high melt viscosity, rigidity and stiffness as to be exceptionally difficult to handle in molding equipment used for the production of many end-use products of polymers. Sometimes the molecular weight of these polymers is so high as to make them completely unfit for molding in usual molding equipment without first subjecting them to molecular weight reduction treatment.

My process involves preparing high molecular weight polymers in intimate admixture with polymers of relatively low thermal stability. A convenient method for obtaining a suitably intimate admixture is to carry out the preparation of the high molecular weight polymer in the presence of the polymer of lower thermal stability. There is obtained from such a preparation an intimate admixture of relatively thermally stable high molecular weight polymers and relatively thermally unstable polymers which, when subjected to thermal treatments of the sort known to the polymerization art for polymer cracking demonstrate an enhanced cracking of the relatively thermally stable polymers as compared to that obtained when such are cracked in the absence of relatively thermally unstable polymers.

By relatively thermally unstable polymers for use in accordance with my invention I mean in general non-structurally regular polymers such as low density polyethylene, non-crystallizable polypropylene, Friedel-Crafts derived polybutenes, polystyrene, copolymers of these, and the like. The relatively thermally stable polymers which can be cracked in accordance with my invention are such as the high density polyethylenes, structurally regular polypropylenes and similar structurally regular 1-olefin polymers of high molecular weight.

The catalysts and conditions of polymerization which can be used with the practice of my invention are any of those leading to relatively high molecular weight thermally stable polymers. These are known to workers in the art. Typical of such catalysts are highly active chromia-on-silica, aluminum alkyl-promoted vanadia-on-silica, aluminum alkyl-promoted titanium halides, and the like.

In practicing my invention, a reaction bomb can be charged with a polymerization catalyst and, if desired, a polymerization solvent, many of which are well known to the art. A relatively thermally unstable polymer is added to the reaction bomb and dissolved in the reaction medium. Alternatively, it can be added in solution in the reaction medium. The 1-olefin to be polymerized is then introduced while the bomb is brought to polymerization conditions. Following polymerization of the desired amount of the 1-olefin, the reactor is emptied of its contents, the catalyst being removed at this stage if desired, and the intimate admixture of polymer products, obtained, after removal of any solvent, is subjected to cracking, by heating to an elevated temperature, preferably under a blanket of an inert gas or by some other cracking technique, e.g. hydrogen cracking. Thermal cracking is carried out at a temperature and for a period of time sufficient to provide the desired amount of cracking, this being readily determined by simple experimentation and varying according to the nature of the polymers involved. The selection of given conditions is well within the skill of the ordinary worker in the art. Thermal cracking is desirably carried out for a time period of at least 15 minutes at a temperature in excess of 300° C., since below this temperature the rate of cracking is undesirably slow while at shorter time periods the amount of cracking is undesirably low. Following thermal or some equivalent cracking treatment, the residue of relatively unstable polymer can be separated from the cracked relatively stable polymer by a solvent fractionation procedure. The solvent to be employed is desirably one in which the relatively unstable polymer is soluble at room temperature and the relatively stable polymer is soluble only at elevated temperature. Suitable solvents can be such as xylenes, hexane, heptane, benzene and the like. Alternatively, a solvent extraction procedure can be used. The total polymer mix is dissolved in solvent at elevated temperature and the solution is then cooled to precipitate the insoluble 1-olefin polymer.

The practice of my invention is more specifically exemplified by the following example.

EXAMPLE

Into a rocking bomb reactor there was charged 26.0 g. of polyisobutene (Amoco H–1900) dissolved in 120 g. of n-heptane. The polybutene was prepared by Friedel-Crafts catalyzed polymerization and had a molecular weight of about 2100 to 2350. To this solution was added 0.0110 g. of 4 weight percent vanadia upon silica (Cab-O-Sil) catalyst which had been subjected to calcination over the temperature range of 25° C. to 550° C. over a period of 1.5 hours. To the mixture there was next added 0.100 g. of aluminum tri-isobutyl promoter, the mol ratio of promoter to vanadia being 250. The reactor, at room temperature, was pressured to 600 p.s.i.g. with ethylene and was then heated to a temperature of 90° C. over one hour. The temperature of 90° C. was maintained for 3.5 hours while ethylene pressure was maintained in the range of 800 to 1250 p.s.i.g. by additional introduction of ethylene as it was consumed. The reactor was cooled to room temperature and from it there was removed 95.7 g. of total solid polymer admixture in the form of a large curd, vacuum dried to remove n-heptane solvent. The yield of polyethylene was 69.7 g. representing a yield of 6970 g. of polyethylene per g. of solid catalyst.

The polymer mixture, obtained as described above, contained 27 weight percent polyisobutene and 73 weight percent polyethylene. The polyethylene component had a melt index of 0.0. 15.0 g. of this mixture was placed in a 300 cc. rocking bomb reactor which was evacuated to 0.1 mm. Hg at room temperature. The bomb was pressured to 200 p.s.i.g. with nitrogen and the system heated over the temperature range of room temperature to 371° C. over 2.25 hours. The system was held at 371° C. for one hour. There was recovered 14.0 g. of solid polymer, one gram having been converted to gaseous product. A 5.0 g. sample of the thermally cracked polymer mixture was dissolved in 200 ml. xylene at 137° C. The solution was cooled to 25° C. and a 3.9 g. precipitate appeared, which was recovered by filtration. Based upon the amount of polyethylene originally in the polymer mixture, theoretical recovery would be 3.74 g. The melt index of the recovered cracked polymer was in excess of 100. This product showed the typical infra-red pattern of high density polyethylene with no evidence of grafted polyisobutene.

A mass spectroscopic analysis of off-gas from the rocking bomb reactor showed the presence of butanes, propanes, ethane, methane, hydrogen and ethylene in addition to the nitrogen blanket gas.

Modifications of and variations upon these specific experimental conditions within the scope of my invention will be apparent to those skilled in the polymer art.

The mechanism of the thermal cracking in my novel process is not known with certainty but it is possible that the relatively thermally unstable polymer undergoes cracking readily to generate free radicals which then act upon the relatively thermally stable polymer to crack its chain. In this way, the one polymer promotes and enhances the cracking of the other.

Having thus described my invention, what I claim is:

1. A process for the preparation of a cracked polyolefin which comprises
    (a) polymerizing a 1-olefin to a relatively thermally stable polymer of high molecular weight selected from the group consisting of high density polyethylene and structurally regular polypropylene in the presence of a relatively thermally unstable polymer selected from the group consisting of non-structurally regular polypropylenes, polybutenes, and polystyrene, and recovering an intimate admixture consisting essentially of the two polymers,
    (b) subjecting said intimate admixture to a thermal cracking treatment, and
    (c) recovering from the thermally cracked admixture a low molecular weight polymer of the relatively thermally stable polymer.

2. The process of claim 1 wherein said 1-olefin is a high density polyethylene and said cracking treatment is effected by maintaining said high density polyethylene at an elevated temperature for a period of time sufficient to raise its melt index.

3. The process of claim 1 wherein high density polyethylene is prepared in the presence of non-structurally regular polybutene to yield an intimate admixture of polymer, said intimate admixture being subjected to a temperature in excess of 300° C. for a period of time of at least 15 minutes sufficient to effect an increase in melt index of said polyethylene, following which cracked polyethylene is separated from said polybutene by dissolving the thermally cracked admixture in a hot organic solvent, cooling said solvent and recovering a precipitate comprising said cracked polyethylene.

References Cited
UNITED STATES PATENTS 3,287,342   11/1966   Walton _____ 260—93.7
3,316,231   4/1967    Canterino et al. _____ 260—93.7

JOSEPH L. SCHOFER, Primary Examiner

S. M. LEVIN, Assistant Examiner

U.S. Cl. X.R.

260—88.2, 93.5, 93.7, 94.9